United States Patent [19]

Truesdell et al.

[11] 4,295,216

[45] Oct. 13, 1981

[54] APPARATUS FOR MEASURING THE CHARACTERISTICS OF A WIDEBAND ELECTROMECHANICAL RECORDING SYSTEM HAVING A TRANSFORMER

[75] Inventors: Raymond L. Truesdell, Cherry Hill; Michael D. Ross, Somerdale, both of N.J.

[73] Assignee: RCA Corporation, New York, N.Y.

[21] Appl. No.: 154,907

[22] Filed: May 30, 1980

[51] Int. Cl.³ .................... H04N 5/76; G11B 27/36
[52] U.S. Cl. ........................ 369/55; 369/53; 369/132; 369/133; 358/127; 324/61 R; 310/318; 310/319
[58] Field of Search ............ 369/132, 133, 55, 53, 369/144, 137; 360/31; 310/319, 318, 314, 311; 324/61 R, 57 R, 98; 358/299, 128.5, 127

[56] References Cited

U.S. PATENT DOCUMENTS

| | | | |
|---|---|---|---|
| 2,400,953 | 5/1946 | Pap | 369/133 |
| 2,516,338 | 7/1950 | Olson | 369/133 |
| 3,842,194 | 10/1974 | Clemens | 358/129 |
| 3,872,498 | 3/1975 | Pritchard | 358/4 |
| 4,035,590 | 7/1977 | Halter | 179/100.41 P |
| 4,044,379 | 8/1977 | Halter | 179/100.41 P |
| 4,060,831 | 11/1977 | Halter | 179/100.4 C |
| 4,152,641 | 5/1979 | Hughes | 369/55 |

*Primary Examiner*—Alan Faber
*Attorney, Agent, or Firm*—E. M. Whitacre; J. S. Tripoli; J. E. Roehling

[57] ABSTRACT

A monitoring circuit for monitoring and measuring the mechanical characteristics of a piezoelectric video disc recording cutterhead takes the form of a bridge network. The motional charge or motional current, which are related to the mechanical characteristics of the cutterhead, is measured by providing signals of a first polarity to one leg of the bridge and signals of a polarity opposite to the first to another leg of the bridge.

One leg of the bridge includes the cutterhead and a sensing capacitor connected in series while the other leg includes the sensing capacitor and a balancing capacitor connected in series. When the capacitance value of the balancing capacitor is properly chosen, the voltage drop across the sensing capacitor is proportional to certain mechanical characteristics of the cutterhead (e.g., displacement).

9 Claims, 7 Drawing Figures

APPARATUS FOR MEASURING THE CHARACTERISTICS OF A WIDEBAND ELECTROMECHANICAL RECORDING SYSTEM HAVING A TRANSFORMER

The present invention relates generally to an electromechanical recording system and, more particularly, to apparatus for monitoring a response and measuring parameters (e.g., stylus displacement) of a piezoelectrically driven cutterhead during the electromechanical recording of a disc substrate.

In certain video disc systems, information is stored on a disc record in the form of geometric variations in a continuous spiral information track (e.g., a groove) disposed on the record surface. Variations in capacitance between an electrode incorporated in a groove-riding stylus and a conductive property of the record are sensed to reproduce the stored information. A capacitance-type video disc system is illustratively disclosed in U.S. Pat. No. 3,842,194 (Clemens).

In one format for the information track in practice of the Clemen's invention, depressed areas extending across the groove alternate with non-depressed areas, where the frequency of alternation varies with the amplitude of video information subject to recording. The form of the recorded signals may be, thus, a carrier whose frequency is modulated over a frequency deviation range in representation of video information. Certain practical considerations in the recording and playback processes have led to the location of the frequency deviation range at 4.3 to 6.3 MHz, and to the limitation of baseband video information to 3 MHz, for example. With this choice of parameters, the highest significant frequency component of the recorded signal is located at 9.3 MHz (e.g., 6.3+3.0 MHz).

In one electromechanical recording system described in U.S. Pat. No. 4,060,831 issued to J. B. Halter on Nov. 29, 1977 the cutterhead used to record the groove and signal information into a copper disc master or substrate is constructed such that its principle resonant frequency is established at a frequency in the midst of the frequency band where most of the energy of the encoded video signal components occurs. In this Halter system an equalizer network whose frequency response characteristic is complementary to the frequency response characteristic of the cutterhead is interposed between the signal source and the piezoelectric element of the cutterhead. The equalizer network serves two purposes. On the one hand, it cooperates with the cutterhead response characteristics to provide a frequency response characteristic which is relatively flat over the bandwidth occupied by the components of the encoded video signal. On the other hand, it serves to attenuate the energy level of signal components lying in the region where most of the energy of the encoded video signal occurs, thereby protecting the cutterhead from application of excessive electric fields. The attenuation of the applied energy makes possible the use of a smaller cutterhead than would otherwise be the case. The smaller cutterhead structure, in turn, results in a relatively wide cutterhead bandwidth.

The compensation necessary to provide a cutterhead response which is flat over the bandwidth of the recording signal which, according to the Clemens patent, is up to 9.3 MHz may not be the same for all cutterheads made under the same nominal conditions. Variations from device to device necessitate the matching of a given equalizer network to a given cutterhead. Therefore, a specialized equalizer should be provided for each particular cutterhead to effect a flat response. In the past the characteristics of a cutterhead have been ascertained by recording into a disc master and then measuring the groove and signal depth. This technique of recording followed by measuring is a difficult and laborious process which may take hours to complete.

Consequently, it is highly desirable to be able to measure the characteristics of cutterheads in general and the displacement of cutterheads during the recording process in particular. A knowledge of cutterhead parameters facilitates the design and/or adjustment of the equalizer network. The ability to monitor cutterhead displacement, especially during the recording process, permits one to adjust the equalizer to optimize the response for the appropriate bandpass characteristics. Also, by monitoring cutterhead displacement the driving voltage which is applied to the cutterhead may be set to a level suitable for a desired displacement. In a concurrently filed application Ser. No. 154,765, filed on May 30, 1980, entitled "APPARATUS FOR MONITORING A WIDEBAND ELECTROMECHANICAL RECORDING SYSTEM" for W. C. Stewart, et al., an apparatus is provided for measuring the characteristics of an electromechanical cutterhead to facilitate the design of an appropriate equalizer network. Further, the apparatus of the aforementioned concurrently filed application provides means for monitoring cutterhead displacement while a recording is being made. The monitoring operation is generally accomplished by providing an external means for monitoring the current through the cutterhead.

In present electromechanical recording methods as described in the Halter U.S. Pat. No. 4,060,831, high signal levels of hundreds of volts are required to drive the cutterhead. In the Halter system, a wideband transformer which has a turns ratio of approximately 1:4 is provided to achieve these relatively high signal levels.

In accordance with the principles of the present invention an apparatus is provided for monitoring the mechanical characteristics (e.g., displacement) of an electromechanical cutterhead during the recording process which incorporates the aforementioned wideband transformer.

In further accordance with the principles of the present invention a monitoring apparatus is provided for measuring a mechanical characteristic of a wideband electromechanical cutterhead in a system for recording signals within a given frequency range in a disc master. The system includes a source for supplying the signals to the cutterhead which is responsive thereto. The cutterhead records representations of the signals in the disc master when relative motion is established between it and the disc master. The apparatus includes a transformer means, which is connected to the signal source, for providing signals of a first polarity to a first signal path and for providing signals of a polarity opposite to said first polarity to a second signal path. In this arrangement the first signal path includes the cutterhead and a sensing capacitor which are connected in series and the second signal path includes a balancing capacitor and the sensing capacitor which are connected in series. The balancing capacitor has a capacitance value such that the potential difference across the sensing capacitor is a substantial representation of the mechanical characteristics of the cutterhead.

Other features and advantages of the invention will be more fully understood from the following detailed description of the preferred embodiment, the appended claims and the accompanying drawing in which:

Figure 1:
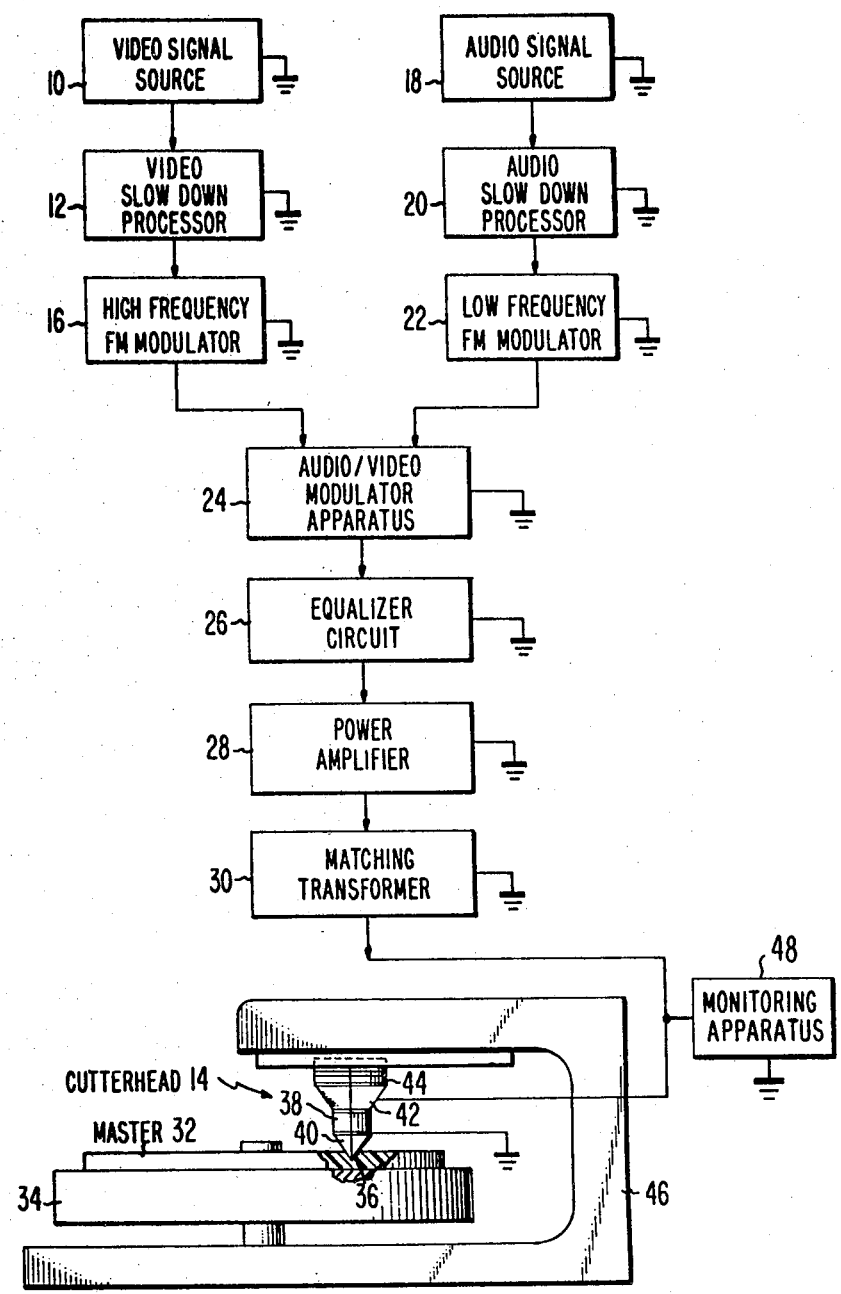
FIG. 1 illustrates, partially in a block diagram form, an electromechanical recording system.

In the electrochemical recording system of FIG. 1, a video signal source 10 supplies a composite video signal, inclusive of luminance information and encoded chrominance information representative of a succession of scanned colored images to be recorded, to a video slow-down processor 12. The composite color video signal supplied by the source may advantageously be in the "buried color subcarrier" format disclosed in the U.S. Pat. No. 3,872,498, issued to D. H. Pritchard, and entitled, "COLOR INFORMATION TRANSLATING SYSTEMS."

The video slow-down processor 12 slows down the output signal of the video signal source 10. In this particular embodiment, the output signal of the video signal source is slowed down by a factor of two (i.e., slowed down video signal extending to 1.5 MHz).

A high frequency FM modulator 16 is coupled to the output of the video slow-down processor 12. The FM modulator 16, incorporating a suitable source of high frequency oscillations, functions to develop at its output terminal a frequency modulated picture carrier signal, the instantaneous frequency thereof varying over a predetermined high frequency deviation range (e.g., 4.3/2 MHz to 6.3/2 MHz) in accordance with the amplitude of the slowed-down composite video signal (e.g., extending to 1.5 MHz) supplied by the source 10. It should be noted that, with this choice of parameters, the highest significant frequency component of the signal developed at the output of the FM modulator 16 is located at 4.65 MHz (i.e., 3.15+1.50 MHz).

The electromechanical recording system of FIG. 1 further includes an audio signal source 18, which supplies an audio signal, representative of a desired sound accompaniment for the colored images being recorded, to an audio slow-down processor 20. The audio slow-down processor 20 likewise slows down the output signal of the audio signal source 18 (e.g., by a factor of two) in order to correlate the audio signal to be recorded with the slowed-down video signal.

A low frequency FM modulator 22, coupled to the output of the audio slow-down processor 20, frequency modulates a slowed-down low frequency carrier over a low frequency deviation range (e.g., 716/2±25 KHz) in accordance with the amplitude of the slowed-down audio signal (e.g. extending to 10 KHz) supplied by the audio slow-down processor.

The outputs of the high frequency FM modulator 16 and the low frequency FM modulator 22 are supplied to a modulator apparatus 24. The modulator apparatus 24 combines the outputs of two FM modulators and supplies the combined signal to an equalizer circuit 26. The equalizer circuit 26 functions to selectively reduce the energy levels of the signal components developed at the output of the modulator apparatus. The output of the equalizer circuit is applied to a cutterhead 14 via a power amplifier 28 and a matching transformer 30.

Coupled to input of cutterhead 14 is a monitoring apparatus 48 for monitoring the mechanical displacement of cutterhead 14. A more detailed description of the monitoring apparatus 48 will be provided herein.

The cutterhead 14, responsive to a relatively high frequency signal at the output of the matching transformer 30 (e.g., the highest frequency signal component occurring at 4.65 MHz) records the signal components in a disc master 32 rotatably supported by a turntable 34. The disc master 32 is rotated at a slowed-down recording speed (e.g., 450/2 rpm) while the cutterhead 14 is translated radially across the disc master by carriage 44 which is movably supported on a frame 46 in correlation with the rotational motion of the disc master, so as to record information along a spiral track 36 on the disc master.

It is noted that when the signal in the aforementioned format is recorded in real time, the video and audio slow-down processors 12 and 20 would be eliminated, the high frequency FM carrier deviation range would be located at 4.3 to 6.3 MHz, the low frequency FM carrier deviation range would be located at 716±50 KHz and the turntable would be rotated at 450 rpm.

Several alternative modes of operation of the modulator apparatus 24 are feasible. In accordance with one mode of operation of the modulator apparatus 24, which may take the form of a linear adder, the once modulated sound signal is added to the once modulated video signal. The combination signal waveform which appears at the output terminal of modulator apparatus 24 is that of picture carrier waves with successive cycles swinging about an average value that undulates in sinusoidal fashion about zero at the sound carrier rate. Reference may be made to U.S. Pat. No. 4,044,379 for J. B. Halter, entitled, "METHOD AND APPARATUS FOR ELECTROMECHANICAL RECORDING OF SHORT WAVELENGTH MODULATION IN A METAL MASTER", for a description of this superposition approach to modulation.

Figure 2:
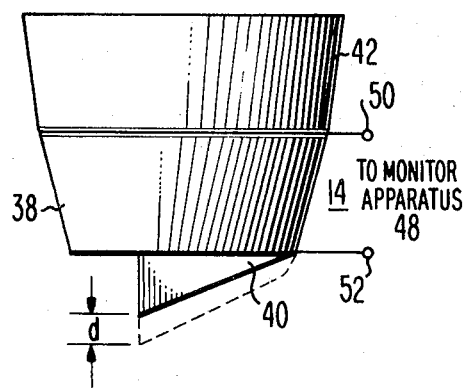
FIG. 2 illustrates an elevation view of a cutterhead suitable for use with the system of FIG. 1.

Referring to FIG. 2, the cutterhead 14 comprises a piezoelectric element 38 (illustratively formed of PZT 8 (trademark) material) interposed between a stylus 40 (illustratively formed of diamond) and pedestal 42 (illustratively formed of steel). Electrodes 50 and 52 are coupled to the upper and lower surfaces of piezoelectric element 38 respectively. A video signal applied to electrodes 50 and 52 effects a motion of the piezoelectric element 38 which, in turn, effects a displacement "d" of stylus 40. The displacement "d" is recorded on rotating copper master 32 as a modulation of the depth of the groove which is cut into the master 32 by stylus 40.

Figure 3:
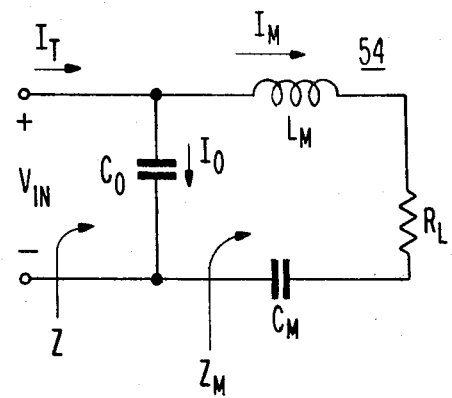
FIG. 3 is an equivalent circuit model of a piezoelectric cutterhead of the type illustrated in FIG. 2.

Referring to FIG. 3, an all electrical equivalent circuit 54 of the device of FIG. 2 is illustrated. Over the frequency range of interest (i.e., DC to 1.2 $f_s$ where $f_s$ is the first significant resonant frequency of cutterhead 14), the equivalent circuit may be represented by series resonant circuit $L_M$, $R_L$, $C_M$ shunted by capacitor $C_o$. The mechanical parameters associated with cutterhead 14 may be derived by measuring the electrical charge, i.e., "mechanical" current which flows through the piezoelectric element 38. For example, the charge $Q_M$ on capacitor $C_M$ is related to the mechanical displacement d where $d = KQ_M$. $Q_M$, which is equal to $\int I_M dt$, may be obtained by subtracting the current $I_O$ through capacitor $C_O$ (current $I_O$ does not contribute to mechanical displacement) from the total current $I_T$ through cutterhead 14 to provide the mechanical current $I_M$. The impedance $Z_M$ which is proportional to mechanical impedance is equal to the voltage $V_{in}$ divided by the current $I_M$, and, the cutting force $F_L$ which is applied to stylus 40 is proportional to the product of the resistance $R_L$ and the current $I_M$. Thus, it can be seen that all of the mechanical parameters of the cutterhead 14, i.e., displacement, mechanical impedance and cutting force, may be obtained by measuring the current $I_M$ or charge $Q_M$ as a function of the frequency.

Figure 4:
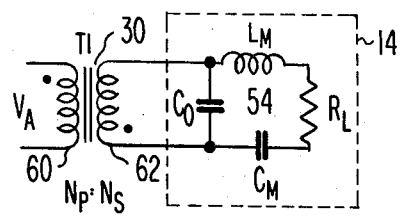
FIG. 4 illustrates in more detail certain aspects of the electromechanical recording system of FIG. 1.

Referring to FIG. 4, a more detailed diagram of some of the elements of FIG. 1 is illustrated. The voltage $V_A$ from power amplifier 28 of FIG. 1 is applied to the primary winding 60 of matching transformer 30. The ratio of the number of turns in secondary winding 62 to the primary 60 is $N_s:N_p$ (illustratively, $N_s:N_p$ is equal to 4:1 to achieve the high signal level of hundreds of volts necessary to drive cutterhead 14). Connected to the secondary winding 62 is the cutterhead 14 which may be represented by the equivalent electrical circuit 54.

Figure 5:
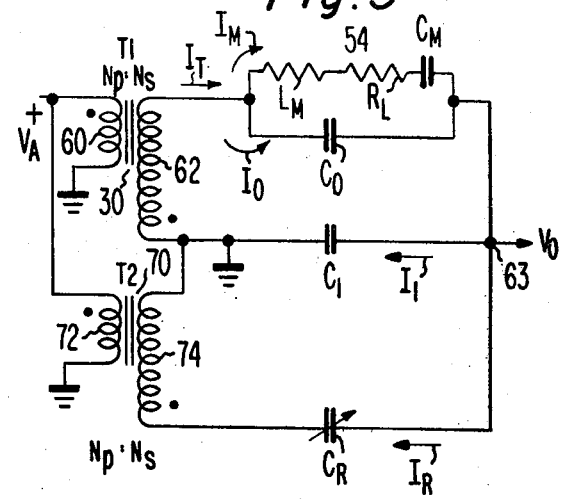
FIG. 5 illustrates a circuit schematic of a monitoring apparatus constructed in accordance with the principles of the present invention.

A circuit schematic of a basic monitoring circuit pursuant to the principles of the present invention which incorporates the matching (driving) transformer 30 is illustrated in FIG. 5. In this arrangement a second transformer 70 which may be similar in construction to matching transformer 30 is used. Primary 72 of transformer 70 is connected in parallel with primary 60 of transformer 30 while the secondaries of the two transformers 30 and 70 are connected in series aiding. Cutterhead 54 is connected between one end of secondary 62 and an output terminal 63 for deriving a voltage $V_o$. Connected between one end of secondary 74 and output terminal 63 is a variable capacitor $C_R$. The series connection of secondaries 62 and 74 is coupled to a reference potential (e.g., ground). Connected between the series connection of secondaries 74 and 62 and the output terminal 63 is a sensing capacitor $C_1$.

In operation, the output voltage $V_o$ from the monitoring circuit is indicative of certain mechanical characteristics of the cutterhead (e.g., displacement both in magnitude and phase). Total current $I_T$ which flows into cutterhead 54 is divided between the capacitor current $I_O$ and the mechanical current $I_M$. The current $I_M$, or its integral $Q_M$, is the parameter related to the mechanical characteristics of the cutterhead which is to be measured. Since neither of these electrical parameters is accessible directly—only $I_T$ or its integral through the piezoelectric element can be measured directly—measurement must be effected by some indirect technique.

Sensing capacitor $C_1$, which is chosen to be much larger than $C_O$, placed in series with cutterhead 54 has a charge applied thereto which is proportional to the current $I_T$. By adding a similar transformer 70 (e.g., identical in construction to transformer 30) and capacitor $C_R$ the current $I_1$ through $C_1$ may be made to equal the current $I_M$. Therefore, a measure of the voltage $V_O$ which is a measure of the voltage across capacitor $C_1$ may be proportional to the current $I_M$, i.e., a mechanical parameter of the cutterhead (e.g., displacement). With transformers 30 and 70 connected as shown in FIG. 5, and variable capacitor $C_R$ set equal to capacitor $C_O$ (the adjustment of capacitor $C_R$ will be discussed in detail herein) current $I_R$ through capacitor $C_R$ becomes equal to current $I_O$ through capacitor $C_O$. Therefore, current $I_1$ through capacitor $C_1$ becomes:

$$I_1 = I_M + I_O - I_R$$

$$I_1 = I_M, \text{ where } I_R = I_O \tag{1}$$

By connecting $V_O$ to one channel of a network analyzer (e.g., Hewlett Packard HP 8407) and $V_A$ to the other, the output voltage which is proportional to the mechanical characteristics of the cutterhead (e.g., displacement) may be obtained both in magnitude and phase. By sweeping $V_A$ over the frequency range of interest the frequency response of $V_O$ (i.e., displacement) may be obtained.

It should be noted that a single center tapped transformer having the required bandwidth may be substituted for transformers 30 and 70 of FIG. 5.

Figure 6:
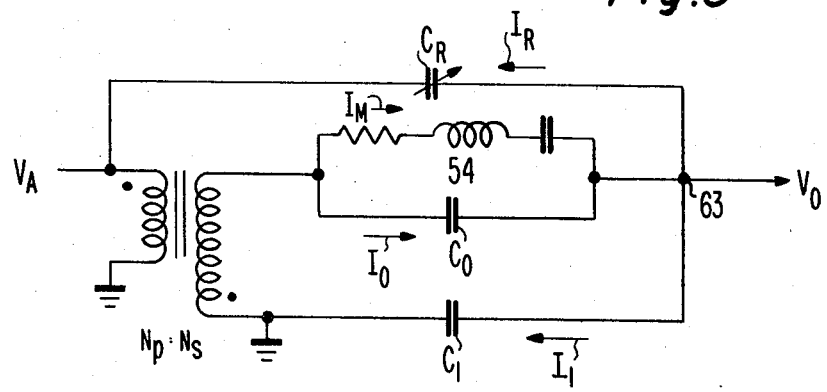
FIG. 6 illustrates another circuit schematic of a monitoring apparatus constructed in accordance with the principles of the present invention.

Referring to FIG. 6 another embodiment of the monitoring apparatus pursuant to the principles of the present invention is illustrated. In this embodiment the second transformer 70 of FIG. 5 is eliminated. In this arrangement the secondary winding of matching transformer 30, cutterhead 54 and sensing capacitor $C_1$ are connected in series as they were in the arrangement of FIG. 5. However, instead of coupling an identical transformer to provide a signal path of opposite polarity (i.e., polarity opposite to that which flows through cutterhead 54) the balancing capacitor $C_R$ is connected between the primary winding of transformer 30 and output terminal 63. This simple circuit, which avoids problems of balance and stray coupling, uses only the original, untapped drive transformer. Since the signal through the cutterhead is 180° out of phase to the transformer input signal $V_A$, the current $I_1$ through capacitor $C_1$ is representative of current $I_M$ through the cutterhead when $C_R$ is properly adjusted. Again $I_1$ through capacitor $C_1$ is equal to:

$$I_1 = I_M + I_O - I_R = I_M \text{ when } I_O = I_R \tag{2}$$

and, therefore, the output voltage $V_O$ is a measure of the mechanical characteristics of the cutterhead. In the arrangement of FIG. 6 the current $I_1$ through capacitor $C_1$ will be equal to $I_M$ when the capacitance value of capacitor $C_R$ is equal to $(N_S/N_P)C_O$. In this arrangement compensation must be made for the transformer turn ratio. Generally, transformer 30 must have a bandwidth adequate for the cutter frequencies and may have a step-up, unity or step-down turns ratio. Normally a step-up ratio would be used to obtain the high voltage levels required to drive the cutter.

In order to measure the mechanical current $I_M$ or mechanical charge $Q_M$ the effective value of capacitor $C_R$ must be set substantially equal to the shunt capacitance $C_o$ such that the current $I_1$ through sensing capacitor $C_1$ is substantially equal to the mechanical current $I_M$. Since $C_o$ cannot be isolated and measured directly it must be measured by some indirect technique. Referring to FIG. 5, let $Q_M$ be the charge across $C_M$ due to current $I_M$ through the series resonant circuit $L_M$, $R_L$, $C_M$. From circuit analysis the charge $Q_M$ may be expressed by:

$$Q_M = \frac{Q \, C_M V_{in}}{\left[ Q^2 \left(1 - \left(\frac{\omega}{\omega_s}\right)^2\right)^2 + \left(\frac{\omega}{\omega_s}\right)^2 \right]^{\frac{1}{2}}}$$

where $\omega_s$ is the angular frequency at resonance, $$\omega_s^2 = \frac{1}{L_M C_M} \quad \text{and} \quad \Omega = \frac{\omega_s L_M}{R_L}.$$

When equation 3 is reduced, it turns out that $Q_M(\omega_s) = Q C_M V_{in}$ at resonance (e.i., where $\omega = \omega_s$) and that $Q_{M \, (low)} = C_M V_{in}$ at low frequencies (i.e., where $\omega < < \omega_s$), therefore, the ratio of $Q_{M \, (\omega_s)}$ to $Q_{M \, (low)}$ is equal to Q. Q is approximately equal to $f_s$ (i.e., resonant frequency of the cutterhead) divided by $\Delta f$ (i.e., the 3 dB bandwidth of the cutterhead response). Since the output voltage $V_o$ is proportional to the charge $Q_M$, the ratio of output voltages may be expressed as:

$$\frac{V_{o(\omega_s)}}{V_{o(low)}} = Q \quad (4)$$

It should be noted that equation (4) is rigorous only when the effective value of $C_R$ equals the value of $C_o$, however, it has been found that the value of $C_R$, and thus $C_o$, can be determined with reasonable accuracy, by this technique.

The procedure for setting $C_R$ (i.e., determining the value of $C_o$) can now be explained. The output voltage $V_o$ at resonance and the Q are measured on an HP 8407 network analyzer.

With these two parameters capacitor $C_R$ may be adjusted while monitoring analyzer display of the cutterhead displacement (i.e., the output voltage $V_o$). When $V_o$ (low) is equal to $V_o$ ($\omega_s$) divided by Q the value of $C_R$ should be substantially equal to $C_o$.

Figure 7:
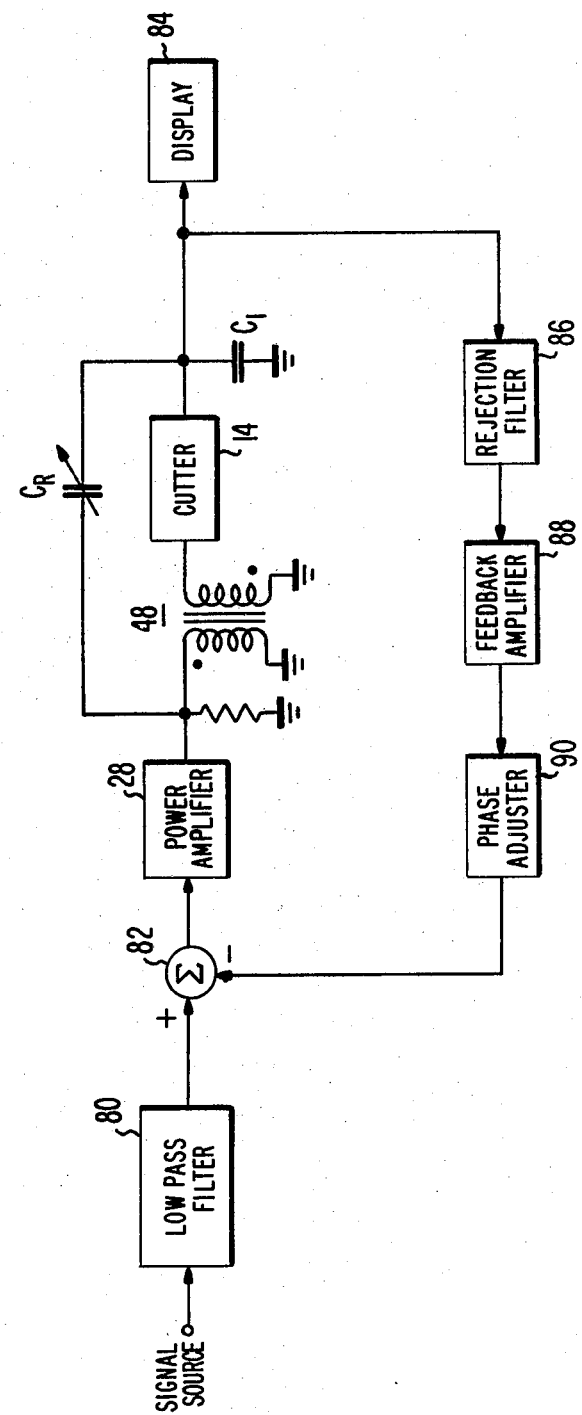
FIG. 7 illustrates a feedback equalization network constructed in accordance with the principles of the present invention.

The operation of the electromechanical recording system of FIG. 1 has been described to this point by a feed forward system, i.e., a system having an equalizer network which is matched to a particular cutterhead to provide a cutterhead response which is nearly flat over the frequency range of interest. Referring to FIG. 7, a feedback arrangement for providing a nearly flat cutterhead response is illustrated.

The signal source, typically from the output terminal of the audio/video modulator apparatus 24 of FIG. 1 is applied to low pass filter 80. The output from low pass filter 80 is coupled to power amplifier 28 via summer 82. From the output of power amplifier 28 the signal is applied to cutterhead/monitor apparatus 14/48. Mechanical parameters which are proportional to the voltage across capacitor $C_1$ are monitored on display 84 which may be a Hewlett Packard network analyzer (e.g., HP 8407). A feedback loop is provided in this arrangement by passing the output signal from cutterhead/monitor 14/48 to the negative input of the summer 82 via rejection filter 86, feedback amplifier 88 and phase adjuster 90.

In operation the response of cutterhead 14 is maintained substantially flat. Low pass filter 80 is designed to reject any signal components out of band which could drive the feedback loop into oscillation. Illustratively, low pass filter 80 has a cut off at approximately 5 MHz when recording video signals at half rate as described herein. Likewise, rejection filter 86 which may illustratively be a tuned circuit aids in rejecting signal components out of band which would drive the circuit into oscillation. Combined with rejection filter 86 is phase adjuster 90 which effects a phase adjustment of signals applied to summer 82. Phase adjuster 90 which may be an all pass phase corrector passes in-band signal components without amplitude change and maintains proper phase relationships between the signals at the plus and minus terminals of summer 82. Feedback amplifier 88 provides loop gain to maintain the response of cutterhead 14 flat over the desired band width. Since cutterheads vary from one to another, feedback amplifier 88 may be provided with a variable gain such that it may be adjusted for the particular cutterhead being used.

While the principles of the present invention have been demonstrated with particular regard to the illustrative structures of FIGS. 1–7, it will be recognized by those of skill in the art that various departures from such illustrative structures may be undertaken in practice of the invention. For example, the monitoring apparatus of FIGS. 5 & 6 may be provided as illustrated in a concurrently filed application Ser. No. 154,765 entitled, "APPARATUS FOR MONITORING A WIDEBAND ELECTROMECHANICAL RECORDING SYSTEM" filed for W. C. Stewart, et al.

What is claimed is:

1. A monitoring apparatus for measuring a mechanical characteristic of a wideband electromechanical cutterhead in a system for recording signals within a given range of frequencies in a disc master, said system including a source for supplying said signals, said cutterhead being responsive to said signals for recording representations of said signals in said disc master when relative motion is established therebetween; said monitoring apparatus comprising:

equalizer means, interposed between said source for supplying said signals and said cutterhead in a series arrangement therewith, for selectively reducing the energy levels of signal components of said signal source;

means, connected to said source, for providing signals of a first polarity to a first signal path and for providing signals of polarity opposite to said first polarity to a second signal path;

said first signal path including said cutterhead and a sensing capacitor;

said second signal path including a balancing capacitor and said sensing capacitor;

said balancing capacitor having a capacitance value such that the potential difference across said sensing capacitor is a substantial representation of said mechanical characteristic of said cutterhead.

2. The apparatus according to claim 1 wherein said means for providing signals comprises a pair of substantially identical wideband transformers having a primary winding of the first connected in a parallel arrangement with a primary winding of the second and having a secondary winding of the first connected at a first point to a secondary winding of the second in a series aiding configuration; wherein said sensing capacitor is connected between said first point and a second point; wherein said cutterhead is connected between said secondary winding of said first transformer and said second point, and wherein said balancing capacitor is connected between said secondary winding of said second transformer and said second point; and wherein said potential difference is measured between said first point and said second point.

3. The apparatus according to claim 1 wherein said means for providing signals comprises a wideband transformer having a center tapped secondary winding; wherein said sensing capacitor is connected between the center tap of said center tapped secondary winding and a first point; wherein said cutterhead is connected between a first terminal of said secondary winding of said transformer and said first point; and wherein said balancing capacitor is connected between a second terminal of said secondary winding of said transformer and said first point; and wherein said potential difference is measured between said center tap and said first point.

4. The apparatus according to claim 1 wherein said means for providing signals comprises a wideband transformer having a primary winding and a secondary winding providing a 180° phase reversal with said transformer primary winding which is connected to said source; wherein said cutterhead is connected between a first terminal of said secondary winding and a first point; wherein said sensing capacitor is connected between a second terminal of said secondary winding and said first point, and wherein said balancing capacitor is connected between said primary winding and said first point; and wherein said potential difference is measured between said second terminal of said secondary winding and said first point.

5. The apparatus according to claim 4 wherein said cutterhead has an equivalent electrical circuit which may be substantially represented by a series resonant circuit in shunt with a capacitor; wherein the ratio of the turns of said secondary winding to said primary winding may be represented by N; and wherein the capacitance value of said balancing capacitor is substantially equal to N times the capacitance value of said shunt capacitance of said cutterhead equivalent circuit.

6. A monitoring apparatus for measuring a mechanical characteristic of a wideband electromechanical cutterhead in a system for recording signals within a given range of frequencies in a disc master; the frequency spectrum of said signals having a region of relatively high energy level, said system including a source for supplying said signals; said cutterhead being responsive to said signals for recording representations of said signals in said disc master when relative motion is established therebetween; said apparatus comprising:

equalizer means, connected to said source, interposed between said source for supplying said signals and said cutterhead in a series arrangement therewith, for selectively modifying the energy level of said signals; said equalizer means being contructed such that the shape of the frequency response characteristic of said equalizer means complements the shape of the frequency response characteristic of said cutterhead so that the combined response of said equalizer means and said cutterhead is relatively uniform over said given range of frequencies;

means, connected to said equalizer means, for providing signals of a first polarity to a first signal path and for providing signals of a polarity opposite to said first polarity to a second signal path;

said first signal path including said cutterhead and a sensing capacitor connected in a series arrangement;

said second signal path including a balancing capacitor and said sensing capacitor connected in a series arrangement;

said balancing capacitor having a capacitance value such that the potential difference across said sensing capacitor is a substantial representation of the mechanical characteristic of said cutterhead.

7. The apparatus according to claim 6 wherein said means for providing signals comprises a wideband transformer having a primary winding and a secondary winding providing a 180° phase reversal with said transformer primary winding which is connected in circuit with said equalizer means; wherein said cutterhead is connected between a first terminal of said secondary winding and a first point; wherein said sensing capacitor is connected between a second terminal of said secondary winding and said first point; wherein said balancing capacitor is connected between said primary winding and said first point; and wherein said potential difference is measured between said second terminal of said secondary winding and said first point.

8. The apparatus according to claim 7 wherein said cutterhead has an equivalent electrical circuit which may be substantially represented by a series resonant circuit in shunt with a capacitor; wherein the ratio of the turns of said secondary winding to said primary winding may be represented by N; and wherein the capacitance value of said balancing capacitor is substantially equal to N times the capacitance value of said shunt capacitor of said cutterhead equivalent circuit.

9. A monitoring apparatus for measuring mechanical characteristic of a wideband electromechanical cutterhead in a system for recording signals within a given range of frequencies in a disc master; the frequency spectrum of said signals having a region of relatively high energy level, said system including a source for supplying said signals; said cutterhead being responsive to said signals for recording representations of said signals in said disc master when relative motion is established therebetween; said apparatus comprising:

means, connected into a feedback loop, for selectively modifying the energy level of said signals, for providing signals of a first polarity to a first signal path and for providing signals of a polarity opposite to said first polarity to a second signal path;

said feedback loop including:

a filter for rejecting any signal components outside of said given frequency range which drive the cutterhead into oscillation;

a phase adjuster for effecting a phase adjustment of the signals which pass through the feedback loop; and an amplifier for providing loop gain such that the mechanical response of said cutterhead is relatively uniform over said given frequency range;

said feedback loop being constructed such that the mechanical response of said cutterhead is relatively uniform over said given frequency range;

said first signal path including said cutterhead and a sensing capacitor connected in a series arrangement;

said second signal path including a balancing capacitor and said sensing capacitor connected in a series arrangement;

said balancing capacitor having a capacitance value such that the potential difference across said sensing capacitor is a substantial representation of the mechanical characteristic of said cutterhead.

* * * * *